United States Patent
Spiss et al.

(10) Patent No.: US 11,637,591 B2
(45) Date of Patent: Apr. 25, 2023

(54) NFC DEVICE AND METHOD OF OPERATING THE SAME

(71) Applicant: NXP B.V., Eindhoven (NL)

(72) Inventors: Thomas Spiss, Graz (AT); Abu Syed Firoz Ismail, Rellingen (DE); Markus Wobak, Graz (AT)

(73) Assignee: NXP B.V., Eindhoven (NL)

( * ) Notice: Subject to any disclaimer, the term of this patent is extended or adjusted under 35 U.S.C. 154(b) by 70 days.

(21) Appl. No.: 17/447,956

(22) Filed: Sep. 17, 2021

(65) Prior Publication Data

US 2022/0116076 A1 Apr. 14, 2022

(30) Foreign Application Priority Data

Oct. 13, 2020 (EP) .................................... 20201558

(51) Int. Cl.
*H04B 5/00* (2006.01)
*H04W 4/029* (2018.01)
(Continued)

(52) U.S. Cl.
CPC ....... *H04B 5/0031* (2013.01); *G06K 7/10306* (2013.01); *G06K 7/10336* (2013.01); *G06K 19/0723* (2013.01); *H04B 5/0062* (2013.01); *H04W 4/023* (2013.01); *H04W 4/029* (2018.02); *H04W 4/80* (2018.02)

(58) Field of Classification Search
CPC ....... H04B 5/0031; H04W 4/029; H04W 4/80
See application file for complete search history.

(56) References Cited

U.S. PATENT DOCUMENTS

| 8,240,561 B2 | 8/2012 | Busch-Sorenson |
| 10,614,450 B1 | 4/2020 | Templeton et al. |

(Continued)

FOREIGN PATENT DOCUMENTS

| EP | 2315170 A1 | 4/2011 |
| EP | 2575408 A1 | 4/2013 |

(Continued)

OTHER PUBLICATIONS

U.S. Appl. No. 17/653,136; Inventor Thomas Spiss et al.'; "NFC Device, Operating Method And Computer Program"; filed Mar. 2, 2022.

*Primary Examiner* — David Bilodeau

(57) ABSTRACT

In accordance with a first aspect of the present disclosure, a near field communication (NFC) device is provided, comprising: a communication unit configured to be communicatively coupled to an NFC reader; a processing unit configured to use a plurality of emulated cards for executing one or more applications; a profile determination unit configured to determine a polling profile of said NFC reader; and a card selection unit configured to select a specific one of said emulated cards for use by the processing unit in dependence on the polling profile determined by the profile determination unit. In accordance with a second aspect of the present disclosure, a corresponding method of operating a near field communication (NFC) device is conceived. In accordance with a third aspect of the present disclosure, a corresponding computer program is provided.

19 Claims, 7 Drawing Sheets

(51) Int. Cl.
*H04W 4/80* (2018.01)
*H04W 4/02* (2018.01)
*G06K 7/10* (2006.01)
*G06K 19/07* (2006.01)

(56) References Cited

U.S. PATENT DOCUMENTS

| | | |
|---|---|---|
| 2009/0077277 A1 | 3/2009 | Vidal et al. |
| 2012/0178366 A1* | 7/2012 | Levy .................. G06K 7/10237 455/41.1 |
| 2013/0006849 A1 | 1/2013 | Morris |
| 2013/0084798 A1 | 4/2013 | Faithorn |
| 2015/0099465 A1 | 4/2015 | Suzuki |
| 2015/0162954 A1* | 6/2015 | Socol ...................... H04W 4/80 455/41.1 |
| 2016/0127857 A1* | 5/2016 | O'Donoghue ....... H04B 5/0031 455/41.1 |
| 2016/0302025 A1* | 10/2016 | Bell ........................ H04W 4/80 |
| 2017/0055109 A1* | 2/2017 | Van Nieuwenhuyze .................... H04W 4/80 |
| 2018/0082285 A1 | 3/2018 | Prabhakar et al. |
| 2018/0158043 A1* | 6/2018 | Noë ........................ G06Q 20/20 |
| 2020/0286061 A1 | 9/2020 | Wang et al. |
| 2021/0067201 A1* | 3/2021 | Wang ...................... H04W 4/80 |

FOREIGN PATENT DOCUMENTS

| | | |
|---|---|---|
| EP | 2626823 A1 | 8/2013 |
| EP | 3133852 A1 | 2/2017 |
| EP | 3467746 A1 | 4/2019 |
| WO | 2016/100112 A1 | 6/2016 |

\* cited by examiner

| Location / Selection | RF Polling Profile | Associated Card |
|---|---|---|
| Location 1 | RF Polling Profile (i) | Card A |
| Location 1 | RF Polling Profile (ii) | Card B |
| Location 1 | RF Polling Profile (iii) | Card B |
| Location 2 | Any | Card C |
| Default | Any | Card D |
| Manual selection | Any | Card E |
| Manual selection | Any | Card F |

NFC DEVICE AND METHOD OF OPERATING THE SAME

CROSS-REFERENCE TO RELATED APPLICATIONS

This application claims priority under 35 U.S.C. § 119 to European Patent Application No. 20201558.2, filed on Oct. 13, 2020, the contents of which are incorporated by reference herein.

TECHNICAL FIELD

The present disclosure relates to a near field communication device. Furthermore, the present disclosure relates to a corresponding method of operating a near field communication device, and to a corresponding computer program.

BACKGROUND

Near field communication (NFC) refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions.

SUMMARY

In accordance with a first aspect of the present disclosure, a near field communication (NFC) device is provided, comprising: a communication unit configured to be communicatively coupled to an NFC reader; a processing unit configured to use a plurality of emulated cards for executing one or more applications; a profile determination unit configured to determine a polling profile of said NFC reader; and a card selection unit configured to select a specific one of said emulated cards for use by the processing unit in dependence on the polling profile determined by the profile determination unit.

In one or more embodiments, the card selection unit is further configured to perform a preselection of a subset of said emulated cards in dependence on a geographical location of the NFC device, and to select said specific emulated card from said subset.

In one or more embodiments, the NFC device comprises one or more further communication units configured to enable determining the geographical location of the NFC device.

In one or more embodiments, the further communication units are at least one of a satellite communication unit, a wireless local area network communication unit, a Bluetooth communication unit, a cellular communication unit, and an ultra-wideband communication unit.

In one or more embodiments, the card selection unit is configured to select a default emulated card if the geographical location of the NFC device has not been determined.

In one or more embodiments, the processing unit is configured to override the selection of the specific emulated card by the card selection unit.

In one or more embodiments, the card selection unit is configured to select said specific emulated card using a programmable mapping table in which polling profiles are mapped to said emulated cards.

In one or more embodiments, the programmable mapping table further maps geographical location information to said polling profiles and emulated cards.

In one or more embodiments, the card selection unit is further configured to select said specific emulated card using a user input which is indicative of a manual selection performed by a user.

In one or more embodiments, the polling profile represents a pattern of radio frequency (RF) transmission events detected by the NFC device when the communication unit is communicatively coupled to the NFC reader.

In one or more embodiments, said emulated cards are used for carrying out transactions with the NFC reader.

In accordance with a second aspect of the present disclosure, a method of operating a near field communication (NFC) device is conceived, the NFC device comprising a communication unit, a processing unit, a profile determination unit and a card selection unit, the method comprising: communicatively coupling the communication unit to an NFC reader; determining, by the profile determination unit, a polling profile of said NFC reader; selecting, by the card selection unit, a specific one of a plurality of emulated cards in dependence on the polling profile determined by the profile determination unit; and using, by the processing unit, the specific emulated card for executing an application.

In one or more embodiments, the card selection unit performs a preselection of a subset of said emulated cards in dependence on a geographical location of the NFC device, and selects said specific emulated card from said subset.

In one or more embodiments, one or more further communication units comprised in the NFC device enable determining the geographical location of the NFC device.

In accordance with a third aspect of the present disclosure, a computer program is provided, comprising executable instructions which, when executed by a near field communication (NFC) device, cause said NFC device to carry out a method of the kind set forth.

DESCRIPTION OF DRAWINGS

Embodiments will be described in more detail with reference to the appended drawings, in which.

DESCRIPTION OF EMBODIMENTS

Figure 1:
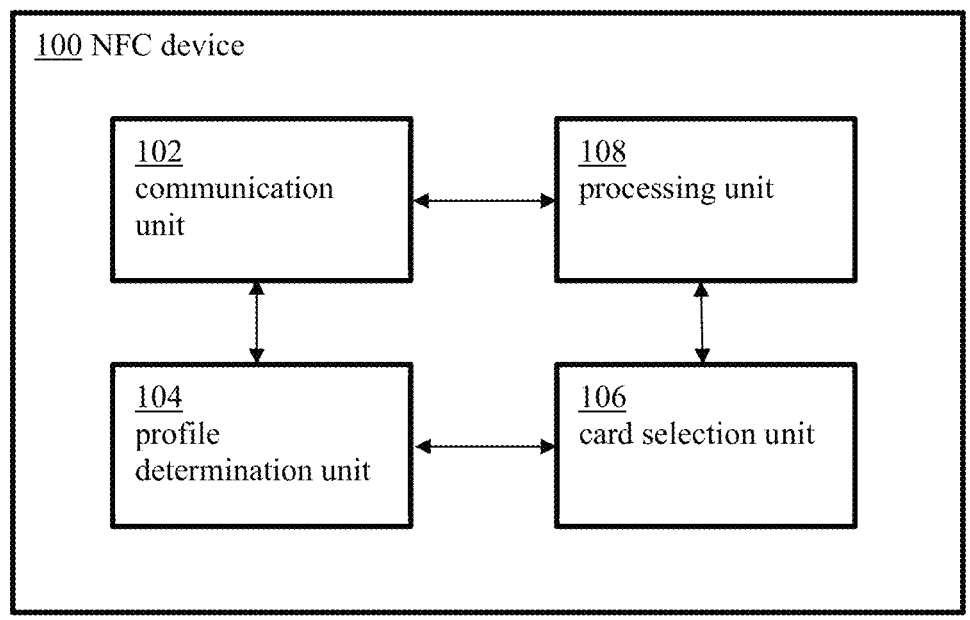
FIG. 1 shows an illustrative embodiment of an NFC device.

As mentioned above, near field communication (NFC) refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions.

For these purposes, physical NFC-enabled transaction cards are often used. Such transaction cards are often referred to as smart cards. Accordingly, different types of transaction cards exist, such as access cards, transit cards and payment cards. Nowadays, NFC-enabled mobile devices such as smart phones may be used to carry out similar transactions. For this purpose, digital representations of physical transaction cards are typically loaded into the mobile devices. In those cases, a processing unit comprised in such a mobile device may execute an application (e.g., a mobile wallet application) that uses a digital representation of a physical transaction card to carry out a specific transaction. Such a digital representation of a physical transaction card may be referred to as an emulated card or an embedded card. In particular, an emulated card may be regarded as a virtual replica of a physical card. For instance, an emulated card may be implemented using a non-volatile memory. Typically, cryptographic methods are applied to access certain parts of the memory. Depending on the use case, related application-specific information may be stored in those parts of the memory. This information may include a unique identifier (e.g., a card number or an employee number), access credentials or a balance equivalent to money (e.g., a so-called "top-up card"). Furthermore, so-called NFC readers may be used to communicate and exchange data with physical NFC-enabled transaction cards and/or emulated or embedded cards.

It is noted that a mobile device of the kind set forth typically supports different types of transactions, for which different emulated cards should be used by the processing unit. For example, a mobile wallet application may contain a plurality of such emulated cards. Furthermore, different applications may be executed by the processing unit, each of which may use different emulated cards. Therefore, it may be difficult to select a correct emulated card when the mobile device is brought into close proximity of a particular NFC reader (i.e., an NFC terminal).

More specifically, if a mobile wallet application contains or is associated with multiple registered cards, then it should be defined which of those cards is to be used for the next NFC transaction. If a wrong card is used, then the transaction will fail and has to be carried out again after activating the correct card. This failed transaction will be recognized by a communication counterpart (e.g., a transit gate reader, door access reader, or payment terminal) and will lead to delays as well potentially additional user actions (e.g., removing and presenting the device again to the reader's field). To prevent this, users have to select one card as the currently active card in the mobile wallet application based on the next transaction they want to perform. In some cases, cards may be enabled based on the location of the mobile device, but given the high density of NFC and RFID terminals in modern cities (e.g., multiple payment, transport or door access readers in close proximity), this approach may not be sufficient to ensure that the correct card is selected.

FIG. 1 shows an illustrative embodiment of an NFC device 100. The NFC device 100 comprises a communication unit 102, a profile determination unit 104, a card selection unit 106, and a processing unit 108. The communication unit 102 is configured to be communicatively coupled to an NFC reader (not shown), which is external to the NFC device 100. The processing unit 108 is configured to use a plurality of emulated cards for executing one or more applications. An example of such an application is the aforementioned mobile wallet application. Furthermore, the profile determination unit 104 is configured to determine a polling profile of said NFC reader, and the card selection unit 106 is configured to select a specific one of said emulated cards for use by the processing unit in dependence on the polling profile determined by the profile determination unit. In this way, the selection of the correct emulated card is facilitated. In particular, the use of the polling profile for the selection of the card may increase the likelihood that the correct card is selected. Furthermore, the correct emulated card may be selected without user interaction.

Figure 2:
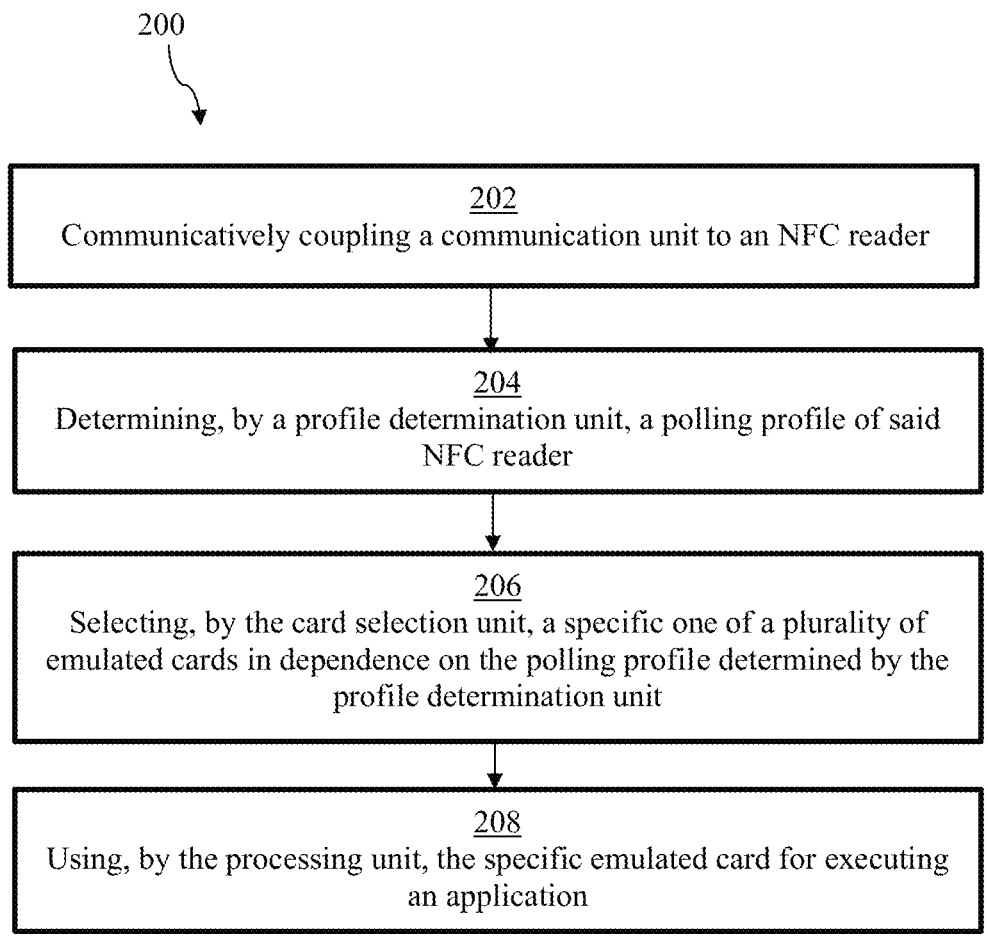
FIG. 2 shows an illustrative embodiment of a method of operating an NFC device.

FIG. 2 shows an illustrative embodiment of a corresponding method 200 of operating an NFC device. The method 200 comprises the following steps. At 202, a communication of the NFC device is commutatively coupled to an NFC reader which is external to the NFC device. At 204, a profile determination unit of the NFC device determines a polling profile of said NFC reader. Furthermore, at 206, a card selection unit of the NFC device selects a specific one of a plurality of emulated cards in dependence on the polling profile determined by the profile determination unit. Furthermore, at 208, a processing unit of the NFC device uses the specific emulated card for executing an application. Thereby, the selection of the correct emulated card is facilitated.

In one or more embodiments, the card selection unit is further configured to perform a preselection of a subset of said emulated cards in dependence on a geographical location of the NFC device, and to select said specific emulated card from said subset. In this way, the selection of the correct card may be further facilitated. In particular, the efficiency of the selection process may be increased. In a practical implementation, the NFC device comprises one or more further communication units configured to enable determining the geographical location of the NFC device. For instance, the further communication units may be a satellite communication unit, a wireless local area network communication unit, a Bluetooth communication unit, a cellular communication unit, and/or an ultra-wideband communication unit. It is noted that also a combination of these different communication units may be used to determine the geographical location of the NFC device. Thus, the further communication units may either determine said location independently or in combination.

In one or more embodiments, the card selection unit is configured to select a default emulated card if the geographical location of the NFC device has not been determined. In this way, the processing unit may still have a card available for use, even if no preselection has been performed. Furthermore, in one or more embodiments, the processing unit is configured to override the selection of the specific emulated card by the card selection unit. In this way, the flexibility of the card selection process may be increased. Furthermore, in one or more embodiments, the card selection unit is configured to select said specific emulated card using a programmable mapping table in which polling profiles are mapped to said emulated cards. In this way, the selection of the correct is further facilitated. Furthermore, the flexibility of the card selection process may be increased, in the sense that the mapping table can be reprogrammed by a user. In a practical implementation, the programmable mapping table further maps geographical location information to said polling profiles and emulated cards. This facilitates the aforementioned preselection of a subset of cards.

In one or more embodiments, the card selection unit is further configured to select said specific emulated card using a user input which is indicative of a manual selection performed by a user. In this way, the user may for example override the automatic selection of a card. In one or more embodiments, the polling profile represents a pattern of radio frequency (RF) transmission events detected by the NFC device when the communication unit is communicatively coupled to the NFC reader. This facilitates the determination of the polling profile by the profile determination unit. Furthermore, in a practical implementation, the emulated cards are used for carrying out transactions with the NFC reader.

It is noted that a default card may be selected in unregistered locations. When the NFC device is positioned in a pre-registered location area (for example, as identified by a non-NFC radio unit such as a GPS, Bluetooth, Wi-Fi or cellular unit), then the active card may be automatically selected based on a detected terminal's RF polling profile, which may be compared to a set of preconfigured and memorized RF polling profiles. This technique allows to select the correct card also in crowded areas with a lot of nearby NFC terminals, where conventional location-based methods fail. To improve usability, this invention may allow to select the correct card before a transaction without a manual selection of the card by a user. This may be achieved by utilizing a two-step approach, of which the first step is to select cards based on the device location. In case more than one card may be used at the current location, then the next step may be to select the correct card based on comparing the reader's RF polling profile to a memorized RF polling profile assigned to a card.

Accordingly, an NFC device with a mobile wallet may contain multiple cards. Only one card can be active at a time and will be presented to a polling NFC terminal (in the associated RF technology). In accordance with the present disclosure, an emulated card may be selected automatically in dependence on the polling profile of the polling NFC terminal. In addition, a preselection of a subset of available cards may be performed in dependence on geographical location information. It is noted that the automatic selection may be overridden by means of a manual selection. For example, a user may manually select a specific payment card in mobile wallet application.

A configurable mapping table may be used to define which card should be presented to the reader. For this purpose, the user may define multiple location areas. In that case, the presence of the mobile device in a particular area may be determined by at least one further communication unit (non-NFC radio unit) available in the mobile device. This determination may for example be made using a global positioning system (GPS) unit, a wireless local area network (LAN) unit, a Bluetooth unit, a cellular network unit, an ultra-wideband (UWB) unit or another out-of-band communication unit, independently or in combination. Additionally, the user may define for one or more of these location areas which card should be used for which terminal based on its RF polling profile. The RF polling profile may be characterized by timestamps which are indicative of the timing of predefined RF events (for example, a FieldOn event, a FieldOff event, a terminal transmission event in a given RF technology, and a given frequency of the RF field). Furthermore, if the user is in an unknown location, a default card may be used. It is noted that a card may be configured to be used at multiple locations. In addition, some cards may be configured to be only manually selectable.

Figure 3:
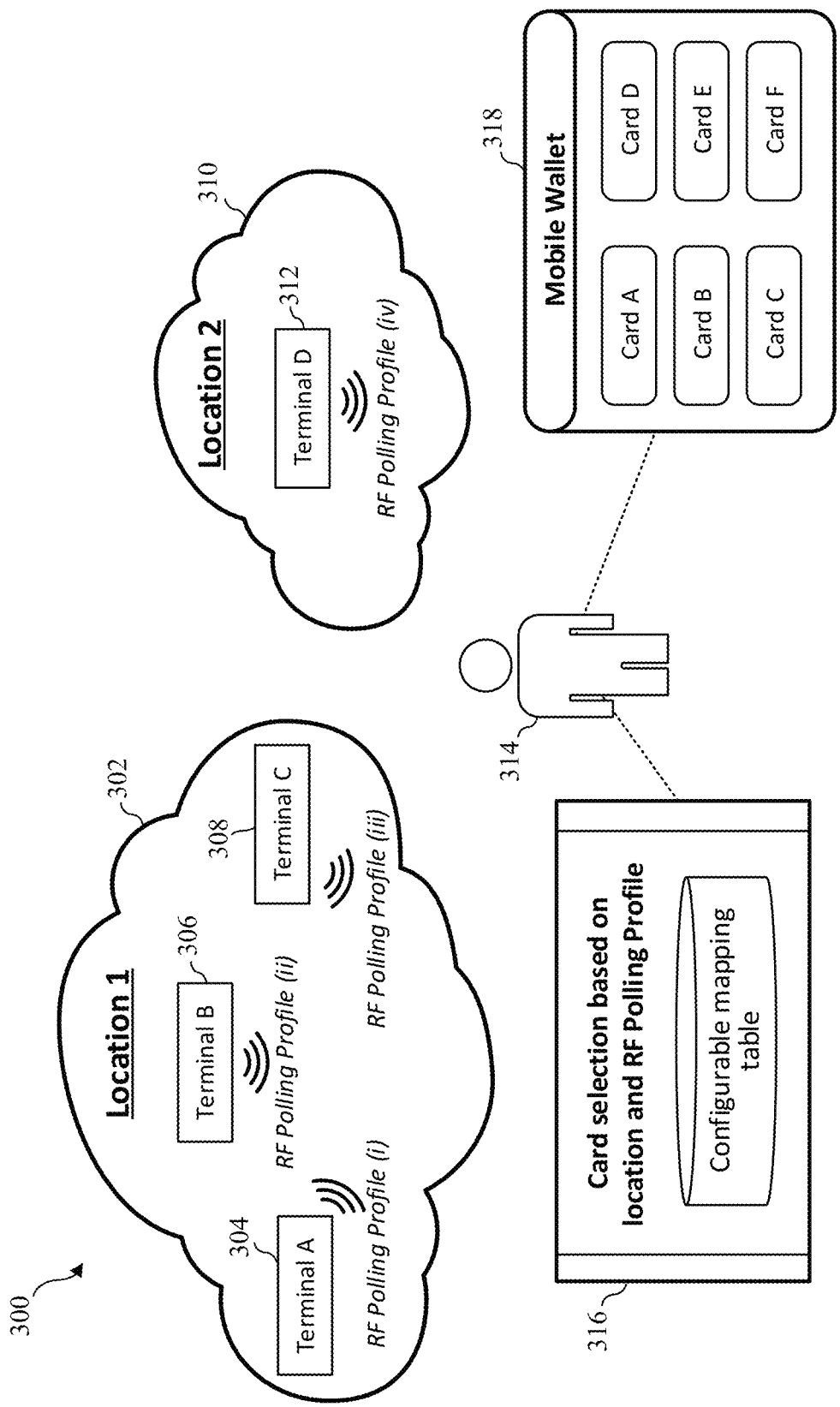
FIG. 3 shows an illustrative embodiment of an NFC system.

FIG. 3 shows an illustrative embodiment of an NFC system 300. The system 300 comprises two geographical locations 302, 310 at which NFC terminals 304, 306, 308, 312 are installed. These terminals 304, 306, 308, 312 (i.e., readers) are configured to be communicatively coupled to a mobile device (not shown) carried by a user 314. The mobile device contains a mobile wallet application 318 containing a plurality of emulated cards. The mobile device is configured to perform a card selection process 316, based on the geographical location of the mobile device and a detected RF polling profile of the terminal which is communicatively coupled to the mobile device at a given moment in time. It is noted that each terminal may have a different polling profile.

In the example shown in FIG. 3, the first location 302 may be a user's home area. In that case, a first terminal 304 (terminal A) could be a vending machine requiring use of a top-up emulated card (Card A), and the other terminals 306, 308 (terminals B and C) could be the door access terminals to access the building or the flat requiring use of another emulated card (Card B). Furthermore, the second location 310 may be the user's work area, and the terminal 312 at this location (terminal D) could be an access terminal requiring use of a further emulated card (Card C). Furthermore, another emulated card (Card D) may be a transit card which may be used in case the user is not close to his home or work location area. Additionally, the user may have emulated cards (Card E and Card F) which are payment cards, and which may be selected manually by the user in case a payment transaction should be performed.

Figure 4:
FIG. 4 shows an illustrative embodiment of a mapping table.

FIG. 4 shows an illustrative embodiment of a mapping table 400. In particular, the mapping table 400 may be used by the mobile device described with reference to FIG. 3, in order to select the correct card for carrying out transactions with the terminals at the different locations and outside those locations.

Figure 5:
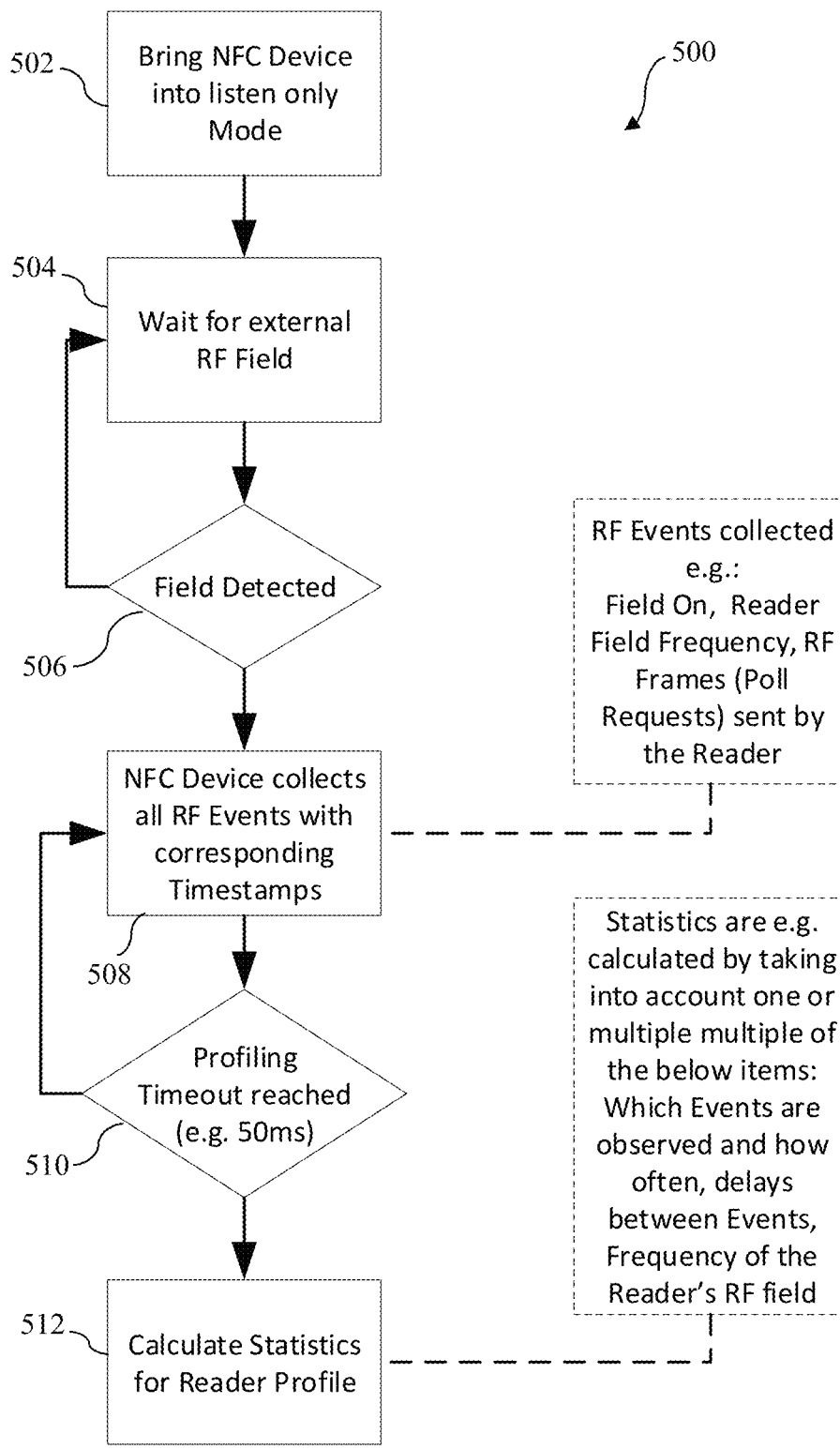
FIG. 5 shows an illustrative embodiment of a profile capturing process.

FIG. 5 shows an illustrative embodiment of a profile capturing process 500. When the NFC device is configured for use, geographical locations and NFC reader polling profiles may be assigned to one or more cards. Subsequently, the presently disclosed card selection process may be applied. FIG. 5 shows a mechanism to capture RF profiles. First, the NFC device will be configured to be in a listen-only mode 502. In this mode, the device will capture all RF events but not reply to them. If an external RF field is detected 506, the device may start to collect all RF events with corresponding timestamps for a given profiling time (e.g., 50 milliseconds). It is noted that this profiling time may be configurable. Non-limiting examples of such captured RF events are a FieldOn event, a FieldOff event, RF frames sent by the reader (e.g., Poll Request frames), and the reader's RF field frequency. The collected events and/or statistics based on these events may then be stored and be used to identify a certain NFC reader.

Figure 6:
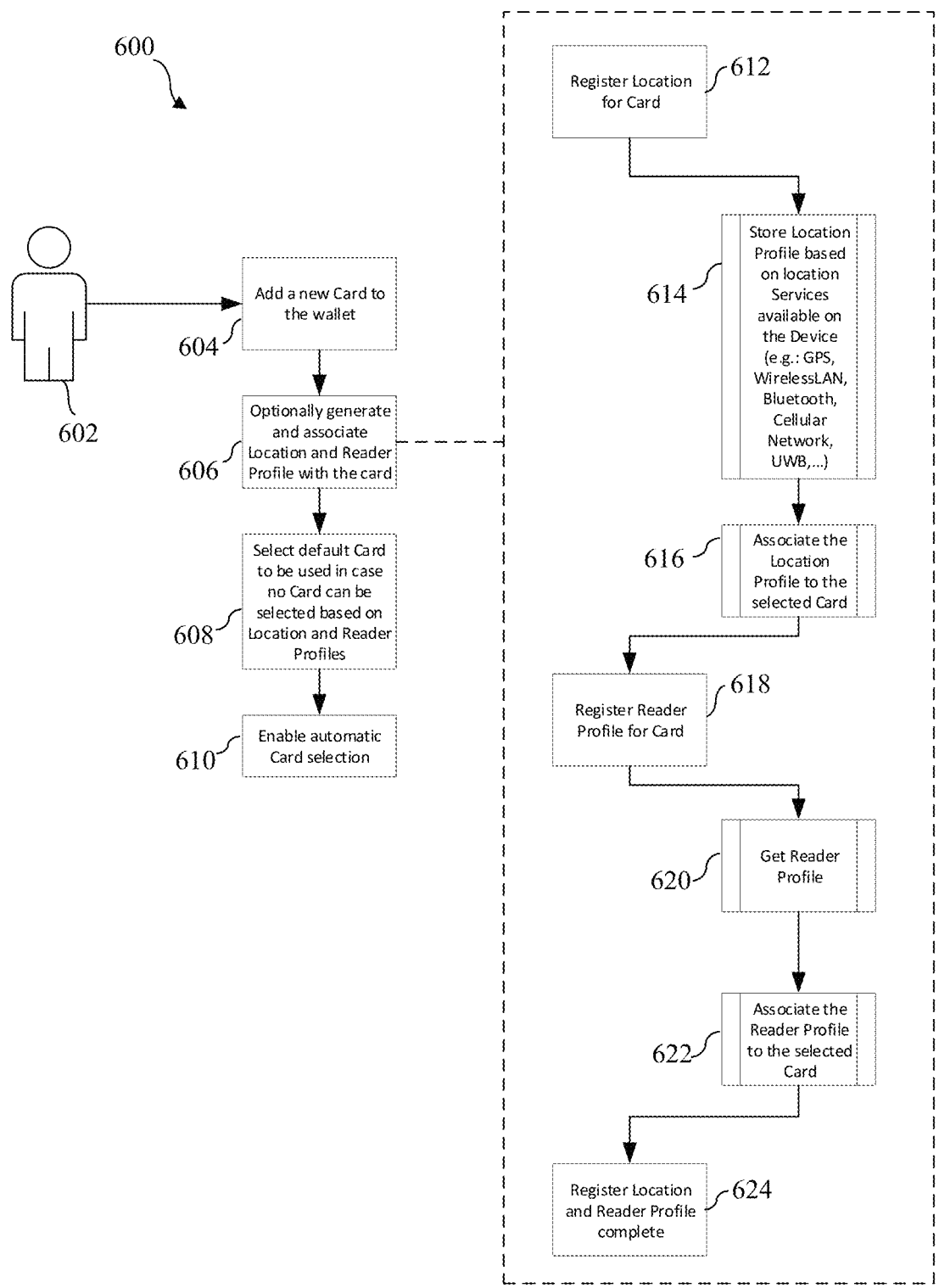
FIG. 6 shows an illustrative embodiment of a location and profile assignment process.

FIG. 6 shows an illustrative embodiment of a location and profile assignment process 600. In order to use apply automatic card selection for a card, the user may generate and assign location data and NFC reader profiles to a card. Typically, this may be done when a user adds a card to the mobile wallet, but it can also be done again later to update the profiles if needed. FIG. 6 shows such a process. When a new card 604 is added to the wallet, users have the option to assign 606 a location profile and an NFC reader profile to the card. The location profile may be based on multiple location services that are accessible on the device. For example, the location profile may be based on the GPS location or a location determined by means of a wireless LAN, Bluetooth communication unit, cellular network, or UWB communication unit. Subsequently, the process for capturing NFC reader polling profiles as described above may be used to capture the NFC reader's polling profile and also assign it to the card. Finally, the user has the option to select 608 the card that should be active by default. This card will be used if no other card has been selected based on the location and reader profile.

Figure 7:
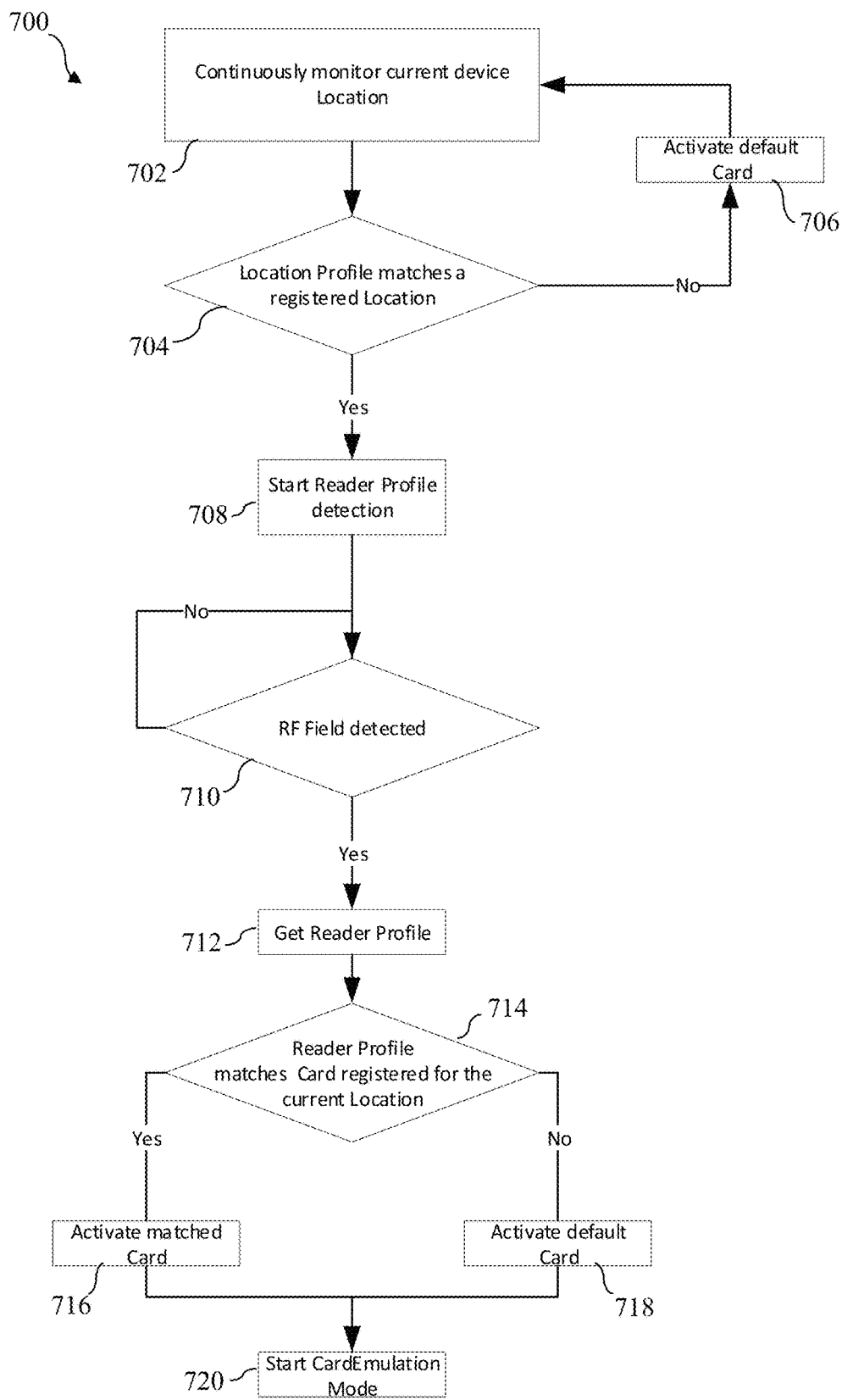
FIG. 7 shows an illustrative embodiment of an automatic card selection process.

FIG. 7 shows an illustrative embodiment of an automatic card selection process 700. In particular, to facilitate that a correct emulated card is selected without any user interaction and no failed transactions with NFC terminals, the flow shown in FIG. 7 may be used. The device location is checked 702 periodically and compared 704 to the location profiles assigned to wallet cards. If no match is found, the default card may be kept active 706. If a location profile is matched, the device may start 708 a reader profile detection process. When a reader profile is captured 712, it may be compared 714 to the profiles assigned to cards in the wallet that match the current location profile. If a match is found, the corresponding card may be activated 716, otherwise the default card may stay active 718. Then, the card emulation mode may be activated 720 and the transaction may be performed.

It should be noted that the reader profile does not need to be an exact match. In particular, a stored profile may be selected which is closest to the captured reader profile, but not exactly the same as the captured reader profile. In other words, the match may not be a full match, but a match within a given margin of deviation. Furthermore, when more than one stored profile has a match within the margin of deviation, the stored profile having the largest similarity to the captured reader profile may be selected. The activation 716 of the card comprises activating the card that corresponds to the selected stored profile. Furthermore, only if the captured reader profile deviates from the reader profile beyond said margin for a given location, the default profile may be activated.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information. As used herein, a "computer-readable medium" or "storage medium" may be any means that can contain, store, communicate, propagate, or transport a computer program for use by or in connection with the instruction execution system, apparatus, or device.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 NFC device
102 communication unit
104 profile determination unit
106 card selection unit
108 processing unit
200 method of operating an NFC device
202 communicatively coupling a communication unit to an NFC reader
204 determining, by a profile determination unit, a polling profile of said NFC reader 206 selecting, by the card selection unit, a specific one of a plurality of emulated cards in dependence on the polling profile determined by the profile determination unit
208 using, by the processing unit, the specific emulated card for executing an application
300 NFC system
302 first location
304 terminal A
306 terminal B
308 terminal C
310 second location
312 terminal D
314 user
316 card selection
318 mobile wallet
400 mapping table
500 profile capturing process
502 bring NFC device into listen only mode
504 wait for external RF field
506 field detected
508 NFC device collects all RF events with corresponding timestamps
510 profiling timeout reached (e.g., 50 milliseconds)
512 calculate statistics for reader profile
600 location and profile assignment process
602 user
604 add a new card to the wallet
606 optionally generate and associate location and reader profile with the card
608 select default card to be used in case no card can be selected based on location and reader profiles
610 enable automatic card selection
612 register location for card
614 store location profile based on location services available on the device (e.g. GPS, wireless LAN, Bluetooth, cellular network, UWB)
616 associate the location profile with the selected card
618 register reader profile for card
620 get reader profile
622 associate the reader profile with the selected card
624 register location and reader profile completed
700 automatic card selection process
702 continuously monitor current device location
704 location profile matches a registered location
706 activate default card
708 start reader profile detection
710 RF field detected
712 get reader profile
714 reader profile matches card registered for the current location
716 activate matched card
718 activate default card
720 start card emulation mode

The invention claimed is:

1. A near field communication (NFC) device, comprising:
a communication unit configured to be communicatively coupled to an NFC reader;
a processing unit configured to use a plurality of emulated cards for executing one or more applications;
a profile determination unit configured to determine a polling profile of said NFC reader;
a card selection unit configured to select a specific one of said emulated cards for use by the processing unit in dependence on the polling profile determined by the profile determination unit.

2. The NFC device of claim 1, wherein the card selection unit is further configured to perform a preselection of a subset of said emulated cards in dependence on a geographical location of the NFC device, and to select said specific emulated card from said subset.

3. The NFC device of claim 2, comprising one or more further communication units configured to enable determining the geographical location of the NFC device.

4. The NFC device of claim 3, wherein the further communication units are at least one of a satellite communication unit, a wireless local area network communication unit, a Bluetooth communication unit, a cellular communication unit, and an ultra-wideband communication unit.

5. The NFC device of claim 2, wherein the card selection unit is configured to select a default emulated card if the geographical location of the NFC device has not been determined.

6. The NFC device of claim 1, wherein the processing unit is configured to override the selection of the specific emulated card by the card selection unit.

7. The NFC device of claim 1, wherein the card selection unit is configured to select said specific emulated card using a programmable mapping table in which polling profiles are mapped to said emulated cards.

8. The NFC device of claim 7, wherein the programmable mapping table further maps geographical location information to said polling profiles and emulated cards.

9. The NFC device of claim 1, wherein the card selection unit is further configured to select said specific emulated card using a user input which is indicative of a manual selection performed by a user.

10. The NFC device of claim 1, wherein the polling profile represents a pattern of radio frequency, RF, transmission events detected by the NFC device when the communication unit is communicatively coupled to the NFC reader.

11. The NFC device of claim 1, wherein said emulated cards are used for carrying out transactions with the NFC reader.

12. A method of operating a near field communication (NFC) device, the NFC device comprising a communication unit, a processing unit, a profile determination unit and a card selection unit, the method comprising:
communicatively coupling the communication unit to an NFC reader;
determining, by the profile determination unit, a polling profile of said NFC reader;
selecting, by the card selection unit, a specific one of a plurality of emulated cards in dependence on the polling profile determined by the profile determination unit;
using, by the processing unit, the specific emulated card for executing an application.

13. The method of claim 12, wherein the card selection unit performs a preselection of a subset of said emulated cards in dependence on a geographical location of the NFC device, and selects said specific emulated card from said subset.

14. The method of claim 13, wherein one or more further communication units comprised in the NFC device enable determining the geographical location of the NFC device.

15. The method of claim 14, wherein the further communication units are at least one of a satellite communication unit, a wireless local area network communication unit, a Bluetooth communication unit, a cellular communication unit, and an ultra-wideband communication unit.

16. The method of claim 13, wherein the card selection unit selects a default emulated card if the geographical location of the NFC device has not been determined.

17. The method of claim 12, wherein the processing unit overrides the selection of the specific emulated card by the card selection unit.

18. The method of claim 12, wherein the card selection unit selects said specific emulated card using a programmable mapping table in which polling profiles are mapped to said emulated cards.

19. The method of claim 12, wherein a computer program comprising executable instructions stored in a computer-readable non-transitory medium, when executed by the NFC device, causes the NFC device to carry out the method.

\* \* \* \* \*